(12) United States Patent
Håkansson et al.

(10) Patent No.: US 9,303,952 B2
(45) Date of Patent: Apr. 5, 2016

(54) COMBINATION SIGHT

(75) Inventors: Håkan Håkansson, Lund (SE); Ralf Wiklund, Ödåkra (SE); Kjell Gunnarsson, Höör (SE)

(73) Assignee: GS DEVELOPMENT AB, Malmö (SE)

( * ) Notice: Subject to any disclaimer, the term of this patent is extended or adjusted under 35 U.S.C. 154(b) by 0 days.

(21) Appl. No.: 12/991,770

(22) PCT Filed: May 8, 2009

(86) PCT No.: PCT/SE2009/050501
§ 371 (c)(1),
(2), (4) Date: Dec. 3, 2010

(87) PCT Pub. No.: WO2009/136858
PCT Pub. Date: Nov. 12, 2009

(65) Prior Publication Data
US 2011/0067288 A1     Mar. 24, 2011

(30) Foreign Application Priority Data
May 9, 2008   (SE) ...................................... 0801055

(51) Int. Cl.
*F41G 1/38*        (2006.01)
*G02B 23/10*       (2006.01)

(52) U.S. Cl.
CPC ............... *F41G 1/38* (2013.01); *G02B 23/105* (2013.01)

(58) Field of Classification Search
CPC ............... F41G 1/16; F41G 1/17; F41G 1/30; F41G 1/34; F41G 1/38; F41G 1/40; G02B 23/00; G02B 23/02; G02B 23/04; G02B 6/35; G02B 26/0816; G02B 26/08; G02B 23/12; G02B 23/14

USPC ........... 42/111, 113, 115, 117, 119, 120, 122, 42/141; 359/353, 388, 399, 421, 424, 427, 359/429, 433, 420, 422; 356/251
See application file for complete search history.

(56) References Cited

U.S. PATENT DOCUMENTS

| | | | | |
|---|---|---|---|---|
| 2,750,833 A | * | 6/1956 | Gross | 356/251 |
| 3,464,770 A | * | 9/1969 | Schmidt | 356/4.01 |
| 3,524,710 A | * | 8/1970 | Rickert | F41G 1/30 356/251 |
| 3,749,494 A | * | 7/1973 | Hodges | F41G 1/30 33/276 |
| 3,790,248 A | * | 2/1974 | Kellow | G02B 23/00 356/251 |
| 3,911,451 A | * | 10/1975 | Vockenhuber | 396/426 |
| 4,030,839 A | * | 6/1977 | Rickert | 356/251 |

(Continued)

FOREIGN PATENT DOCUMENTS

| | | | | |
|---|---|---|---|---|
| CH | 667150 A5 | * | 9/1988 | F41G 1/38 |
| EP | 0651225 A1 | | 5/1995 | |

(Continued)

*Primary Examiner* — Bret Hayes
*Assistant Examiner* — Derrick Morgan
(74) *Attorney, Agent, or Firm* — Capital City TechLaw

(57) ABSTRACT

A combination sight comprises a magnifying optical sight and a non-magnifying optical sight arranged in parallel. The combination sight is characterized in a switchable component capable of assuming two states so as to deflect a beam path through the combination sight, wherein the first state allows for a user to observe a target through the non-magnifying sight and the second state allows for a user to observe a target through the magnifying sight while keeping an aiming eye static.

11 Claims, 3 Drawing Sheets

(56) References Cited

U.S. PATENT DOCUMENTS

| | | | | |
|---|---|---|---|---|
| 4,084,326 A * | 4/1978 | Numbers | | F41G 1/30 356/254 |
| 4,483,598 A * | 11/1984 | Leightner et al. | | 359/420 |
| 4,561,204 A * | 12/1985 | Binion | | 42/122 |
| 4,582,400 A * | 4/1986 | Lough | | F41G 1/40 313/524 |
| 4,841,659 A * | 6/1989 | Williams | | 42/124 |
| 4,863,269 A * | 9/1989 | Ellis | | 356/251 |
| 4,945,646 A * | 8/1990 | Ekstrand | | 42/113 |
| 5,035,472 A * | 7/1991 | Hansen | | 359/350 |
| 5,140,151 A * | 8/1992 | Weiner | | G02B 23/14 359/226.2 |
| 5,189,555 A | 2/1993 | Jorlov | | |
| 5,272,514 A * | 12/1993 | Dor | | 356/251 |
| 5,349,469 A * | 9/1994 | Francis | | 359/420 |
| 5,497,266 A * | 3/1996 | Owen | | 359/353 |
| 5,561,563 A * | 10/1996 | Chesnut et al. | | 359/823 |
| 5,793,528 A * | 8/1998 | Wallace | | G02B 23/14 248/481 |
| 5,946,132 A * | 8/1999 | Phillips | | G02B 23/12 359/350 |
| 6,154,313 A * | 11/2000 | Isbell et al. | | 359/419 |
| 6,204,961 B1 * | 3/2001 | Anderson et al. | | 359/353 |
| 6,336,285 B1 * | 1/2002 | Baumer | | 42/124 |
| 6,487,809 B1 * | 12/2002 | Gaber | | F41G 1/30 359/420 |
| 6,601,966 B1 | 8/2003 | Wiklund et al. | | |
| 6,643,969 B1 * | 11/2003 | Avizonis, Jr. | | 42/118 |
| 6,886,287 B1 * | 5/2005 | Bell et al. | | 42/120 |
| 6,999,649 B1 * | 2/2006 | Chen et al. | | 385/18 |
| 7,257,920 B1 * | 8/2007 | Shaffer et al. | | 42/118 |
| 7,437,848 B2 * | 10/2008 | Chang | | 42/119 |
| 7,768,703 B2 * | 8/2010 | Winker et al. | | 359/432 |
| 7,872,747 B2 * | 1/2011 | Gerlach | | F41G 1/30 356/251 |
| 7,911,687 B2 * | 3/2011 | Scholz | | 359/353 |
| 2005/0241209 A1 * | 11/2005 | Staley, III | | 42/111 |
| 2006/0164718 A1 | 7/2006 | Tai | | |
| 2007/0109638 A1 * | 5/2007 | Tai | | 359/399 |
| 2007/0177154 A1 * | 8/2007 | Rembe | | 356/498 |
| 2009/0064514 A1 * | 3/2009 | Roes | | 33/227 |
| 2010/0077646 A1 * | 4/2010 | Gaber et al. | | 42/123 |
| 2011/0041377 A1 * | 2/2011 | Thomas et al. | | 42/120 |
| 2011/0099881 A1 * | 5/2011 | Jung et al. | | 42/113 |
| 2011/0271576 A1 * | 11/2011 | Jahromi | | 42/122 |
| 2012/0030985 A1 * | 2/2012 | Mauricio et al. | | 42/84 |
| 2012/0033195 A1 * | 2/2012 | Tai | | 356/4.01 |

FOREIGN PATENT DOCUMENTS

| | | |
|---|---|---|
| EP | 1868023 A1 | 12/2007 |
| FR | 2541467 A1 | 8/1984 |
| GB | 2245988 A | 1/1992 |
| WO | 2007006563 A1 | 1/2007 |
| WO | 2007030101 A1 | 3/2007 |

\* cited by examiner

COMBINATION SIGHT

PRIORITY STATEMENT

This US non-provisional application claims priority under 35 USC §119 to Swedish Patent Application No. 0801055-5 filed May 9, 2008, the content of which is incorporated herein in its entirety by reference.

TECHNICAL FIELD

The present invention relates to sights, and in particular to combination sights comprising a magnifying sight and a non-magnifying sight.

BACKGROUND

When using sights for hunting and other field application there may be a conflict between speed and precision, speed being the time period between spotting the target, with the rifle lowered, and firing the first round. This speed is particularly important when shooting at targets in short ranges, where e.g. a game may appear and disappear within few seconds of time. Generally, the highest speed is achieved when sights not including any magnifying optics, which need to have a certain eye relief, are used, since the eye then will not have to find the virtual image of a reticle and a target, and superimpose the one on the other before the first round is fired. Magnifying optics also have restrictions regarding field of view.

Often the price paid for the speed is precision. In order to obtain better precision, in long distance shooting (e.g. >300 m) in particular, a telescopic sight may be preferred, e.g. with a magnification of three times (3×) or with a variable magnification or zoom (3-6×). A telescopic sight is defined by some characteristic parameters, such as the field of view, entrance pupil, exit pupil, eye relief, magnification, etc. These features are interconnected, such that if e.g. the eye relief is incorrect (not the correct distance between the eye and the eyepiece lens) the field of view will suffer. Magnifying sights, or telescopic sights, are well known, having a fixed magnification or a zoom function. Further details of telescopic sights will not be discussed here.

The telescopic sight is inferior in terms of speed, since the aiming eye has to find the exit pupil, find the target through the telescope and superimpose the reticle image on the target, and then fire a round. Further, when using a magnifying telescopic sight only one eye, the aiming eye, can be open, which further slows the speed of target acquisition. Having both eyes open and receiving a non-magnified image in one and a magnified in the other generally is too much information for the visual organs to handle.

Manufacturers of sights have strived to provide a sight with the benefits of both of the above sights, and a known combination includes a telescopic sight having an iron sight on its upper side, see e.g. U.S. Pat. No. 4,841,659. There are other known combinations where two optical sights are arranged side-by-side (or on top of each other), combined in one casing or not.

SUMMARY

The present invention aims at providing a sight, which eliminates or alleviates some of the problems with prior art sights.

To that end the inventive sight comprises a magnifying sight and a non-magnifying sight arranged in parallel, and is characterized in that it further comprises a switchable component capable of assuming two states so as to deflect a beam path through the combination sight, wherein the first state allows for a user to observe a target through the non-magnifying sight and the second state allows for a user to observe a target through the magnifying sight.

The switchable component makes it possible for the user to switch the position of this component instead of the eye when alternating between the magnifying and the non-magnifying sight. As discussed earlier the non-magnifying sight generally is the "fastest" sight, and with the inventive arrangement it is possible to first find the target in the non-magnifying sight and thereafter, if needed, switch to the magnifying sight, without altering the position of the aiming device, generally a gun. Since the position of the eye may remain constant in the line of sight, the surroundings of the target will be familiar, and thus the aiming with the magnifying sight will be fast. Further, not having to move the eye, and thus not the head upwards to be able to use the upper sight, enables the user to keep a low profile. It should be noted that the eye may have to be moved slightly along the line of sight, to adapt to the eye relief of the magnifying sight. Having the sights mounted on top of each other is preferred, since it generally obscures the peripheral vision less, and allows for both eyes to study the target and the surroundings thereof while aiming. Cases where the sights are mounted side-by-side are however possible, and by using the invention tilting of the aiming device, or horizontal movement of the eye, is not necessary.

In one or more embodiments the non-magnifying optical sight is a red dot sight with unlimited eye-relief. Some non-magnifying sights involve imaging optics, and thereby they will have the same drawbacks as the telescopic sight in regard of the limited eye-relief. Those embodiments of the invention involving a red dot sight will have the advantage of unlimited eye relief. The user will only have to look into the sight, superimpose the red dot on the target, and fire. No eye adjustment is necessary; the sight is virtually parallax free and the user may have both eyes open and thus have an increased perception of the surroundings.

In one or more embodiments the non-magnifying optical sight is a holographic sight. A holographic sight may be used instead of the red dot sight, yet presently holographic sight consume more energy than some red dot sights, which makes them a worse alternative for some applications.

In one or more embodiments the switchable component may be a mechanical beam path deflector, such as a mirror or a prism, movable between two positions and thus capable of deflecting the beam path. The use of a mechanical beam path deflector is a rugged, durable solution, that requires no power source if switched manually.

In other embodiments the switchable component may be an optronic component, such as a liquid crystal display (LCD) component, capable of switching between a light transmitting state and a light reflecting state.

In one or more embodiment the magnifying and the non-magnifying sights may be mounted on top of each other, within a common housing. This mounting results in a less bulky sight than alternative mountings. Further, the parallax between a bore of a gun and the optical axis of the sights is reduced to one dimension (as compared to a side-by-side mounting where the sight is offset in height as well as side relative to the bore).

In an embodiment, a system may include a beam splitter that reflects and transmits only one polarization of light, and a system may include two switchable components arranged to selectively permit passage of light of one polarization only, such that the two systems may be used in combination to selectively permit passage of light.

In an embodiment, a system may include two switchable components, each of which is capable of functioning as a filter permitting passage of light with one particular polarization, which polarization may be rotated 90°, and a polarization filter, such that the switchable component and the polarization filter may be used in combination to permit, or block, passage of light.

The above sight may be used for aligning of various types of devices, and in the preferred embodiment the sight is used on a gun. The inventive sight is primarily developed for a gun with a caliber up to caliber .50.

DETAILED DESCRIPTION

Figure 1:
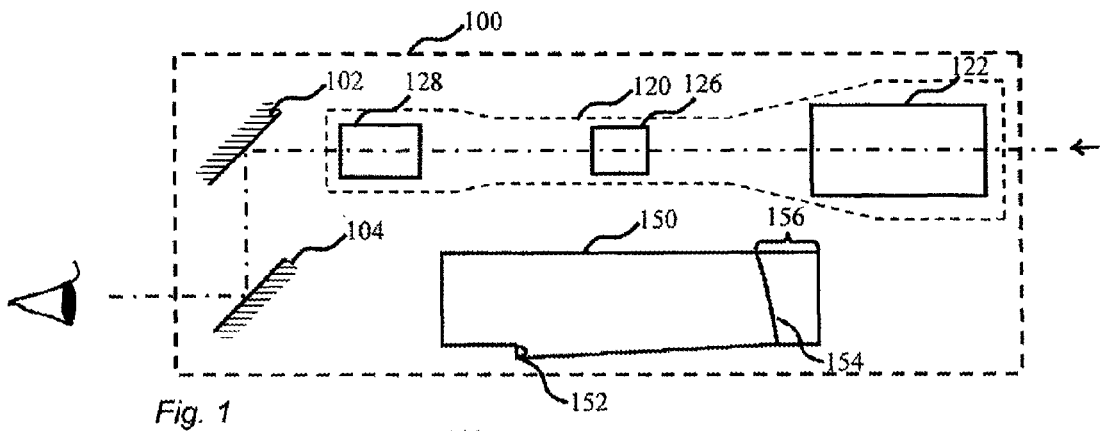
FIG. 1 is a schematic drawing of a first embodiment of the inventive combination sight, illustrating the beam path through the sight when the switchable component is in the first position.
Figure 2:
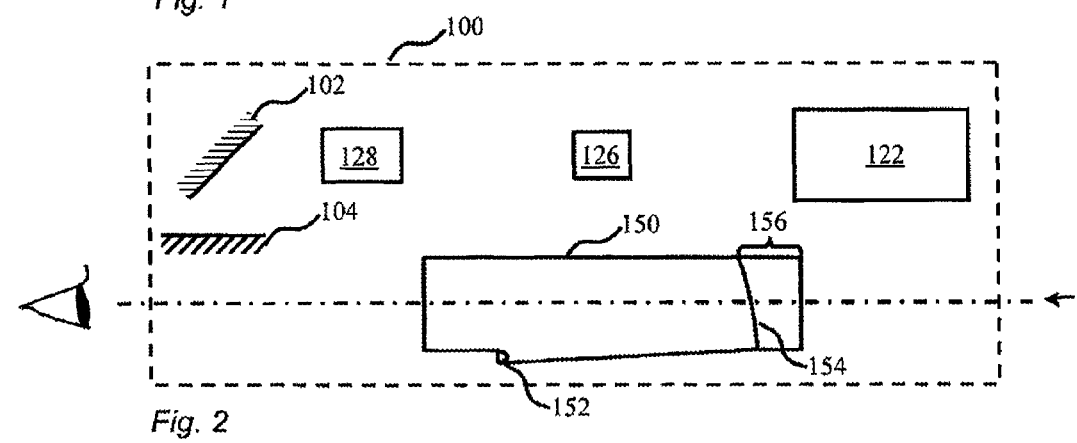
FIG. 2 illustrates the embodiment of FIG. 1, with the switchable component in the second position.

In FIG. 1-4 the user is to the left and the target to the right. FIGS. 1 and 2 are schematic views of a first embodiment of the inventive combination sight 100. The dash-dotted line of FIGS. 1 and 2 shows the beam path in each case. The combination sight 100 comprises a magnifying telescopic sight 120 and a true red dot sight 150. To improve the ruggedness and stability the two sights 120 and 150 are arranged within the same housing. In FIG. 1 the outline of a regular telescopic sight is shown in phantom line to facilitate understanding. This outline is omitted from subsequent drawings.

The telescopic sight 120 is of standard design, with an objective lens system 122 a reticle (not shown) arranged in the focal plane of the objective lens system 122, the associated reticle control is not shown in FIGS. 1-4. Thereafter follows an inversion lens system 126 for inverting the image created by the objective lens system 122, and an ocular lens system 128 for observing the inverted image. It should be noted that there are other commonly used designs of telescopic sights, e.g. the reticle may be arranged in the plane of the inverted image, and a prism combination may be used for inversion of the image, instead of a lens system.

The red dot sight 150 has a basic construction in which the light from a light source 152 is reflected by a concave mirror 154, basically only reflecting light having the wavelength of the light source 152. The light source 152 may be of the type described in U.S. Pat. No. 6,601,966, hereby incorporated by reference. The concave mirror 154 has a curvature with the light source 152 is placed in the focal point and adapted to direct parallel beams from the light source 152 in the direction of the user. Corrective optics 156 makes the sight 150 non-refractive. For further details of the parallax free red dot sight, see U.S. Pat. No. 5,189,555, hereby incorporated by reference. In this context it should be noted that the present invention in its broadest form as defined by the claims, is not limited to this specific type of red dot sight, however, in traditional iron sights the rear sight needs to be aligned with the front sight and the target, while for a red dot sight it is enough that the red dot is aligned with the target. This makes true red dot sight faster and more reliable in terms of shot accuracy. Sights using reticles of more complex designs may be adequate for deduction for calculation of distance to target etc, but they are generally difficult for the eye to interpret, and by that not as fast. This does not make them unusable for the present invention, yet they are not the first choice if speed is an issue.

In the embodiment of FIGS. 1-2 the telescopic sight 120 is arranged on top of the red dot sight 150. A reflective surface 102 is arranged in front of the ocular lens system 128 (in a system where the eye of a user is in front of the ocular lens system 128) and directs beams exiting the telescopic sight 120 downwards, towards a second reflective surface 104. The second reflective surface 104 directs the light towards the user, so that the user may observe the target via the reflective surfaces 102 and 104, respectively. The second reflective surface 104 is pivotally mounted, so that it can be selectively arranged in two distinct positions. In the first distinct position the second reflective surface 104 performs the deflection described above, and it also positioned such that it prevents a user from observing a target through the red dot sight 150. In FIG. 2 the second reflective surface 104 is arranged in a second position, in which it allows for a user to observe the target through the red dot sight 150, and to use the sight 150 to aim at a target. Instead of being pivotally mounted the switchable component may be arranged to slide into position.

Figure 3:
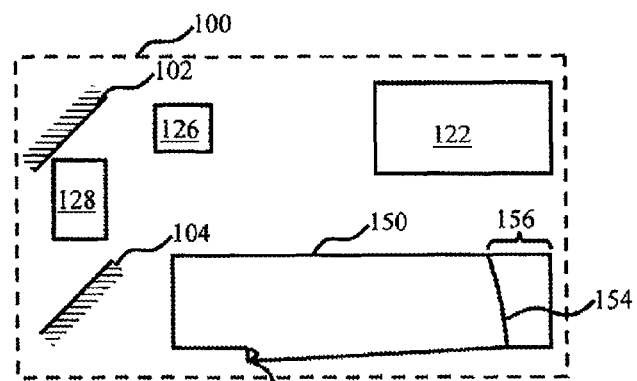
FIG. 3 illustrates a second embodiment, similar to the first but using a folded beam path within the telescopic sight.

The sight of FIGS. 1 and 2 has a straightforward design. The design of the embodiment of FIG. 3 is more elaborate, since the ocular lens system 128 in this case is located between the reflective surfaces. One reason for preferring this construction is that it increases the eye relief, or rather; the available eye relief is to a less extent consumed within the sight itself. It is therefore possible for the user to locate the eye farther away from the sight. Other components may remain unchanged. Using this construction, with a folded optical path, it may also be possible to obtain a more compact design of the sight, in terms of its length.

Figure 4:
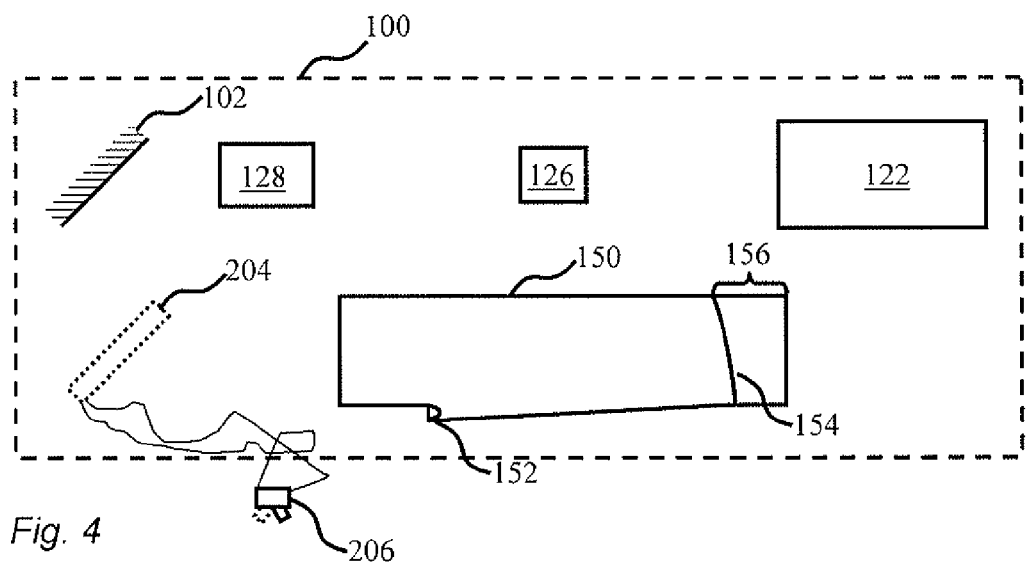
FIG. 4 is a schematic drawing of the inventive combination sight according to a third embodiment.

In the third embodiment, shown in FIG. 4, the switchable component is an optronic device 204, capable of selectively transmitting or reflecting light. The switchable component 204 is controlled by application of an electrical voltage. With no applied voltage the component 204 will be in a first, reflective/transmittive, state, and with applied voltage the component will be in a second, transmittive/reflective, state. The choice of first and second state may be altered based on the function of the sight. For guns, use of a non-magnifying sight may be the default, and then the first state will be the transmittive, since this will reduce power consumption for the shown embodiment. This electronic solution has the advantage that the state of the component 204 may be switched by, e.g., pressing a button. This may be performed by the user with minimal effort, thus with minimal impact movement of the sight. The switch button 206 may be positioned on the sight 100 itself, or remote controlled. This could be accomplished by using an LCD device that is able to switch between a reflective state and a transmittive state.

Figure 5:
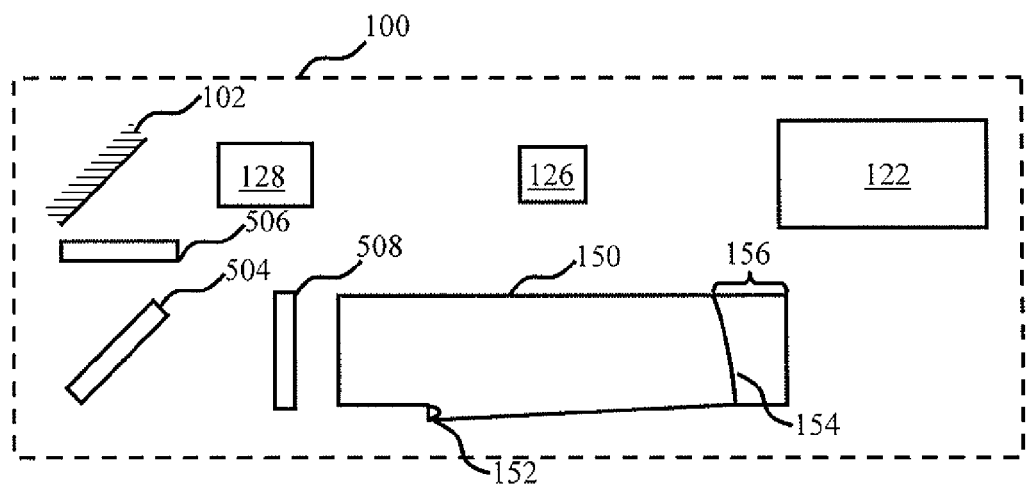
FIG. 5 is a schematic drawing of the inventive combination sight according to a fourth embodiment.

FIG. 5 illustrates a fourth embodiment of the present invention. This embodiment has the same advantage as the previously mentioned one, in that it does not comprise any movable parts. Specifically, the optronic device of the previous embodiment is replaced by a beamsplitter 504, such as a 50:50 broadband plate beamsplitter. In the beam path between the entrance window of the telescopic sight and the beam splitter 504 an optronic component 506 is arranged, and the same type of optronic component 508 is arranged in the corresponding beam path of the red dot sight. The optronic devices are capable of switching between a transmittive state and a non-transmittive state by means of the application of a voltage, examples include LCD-components and polarizers. By using such components it is possible to select the default state (the state assumed by the component when no voltage is applied), such that the beam path through the red dot sight is open when no voltage is applied. As the voltage is applied, it is applied simultaneously on both components 506 and 508, and the beam path through the red dot sight is closed, while the beam path trough the telescopic sight is opened, thus being the active beam path. The control may be performed with low power consumption. The operation of the components 506 and 508 may be accomplished using a larger number of components, yet this is considered to fall within the scope of the appended claims.

According to the embodiment in FIG. 5, a system may include a beam splitter that reflects and transmits only one polarization of light, and a system may include two switchable components arranged to selectively permit passage of light of one polarization only, such that the two systems may be used in combination to selectively permit passage of light.

Furthermore, a system may include two switchable components, each of which is capable of functioning as a filter permitting passage of light with one particular polarization, which polarization may be rotated 90°, and a polarization filter, such that the switchable component and the polarization filter may be used in combination to permit, or block, passage of light.

Figure 6:
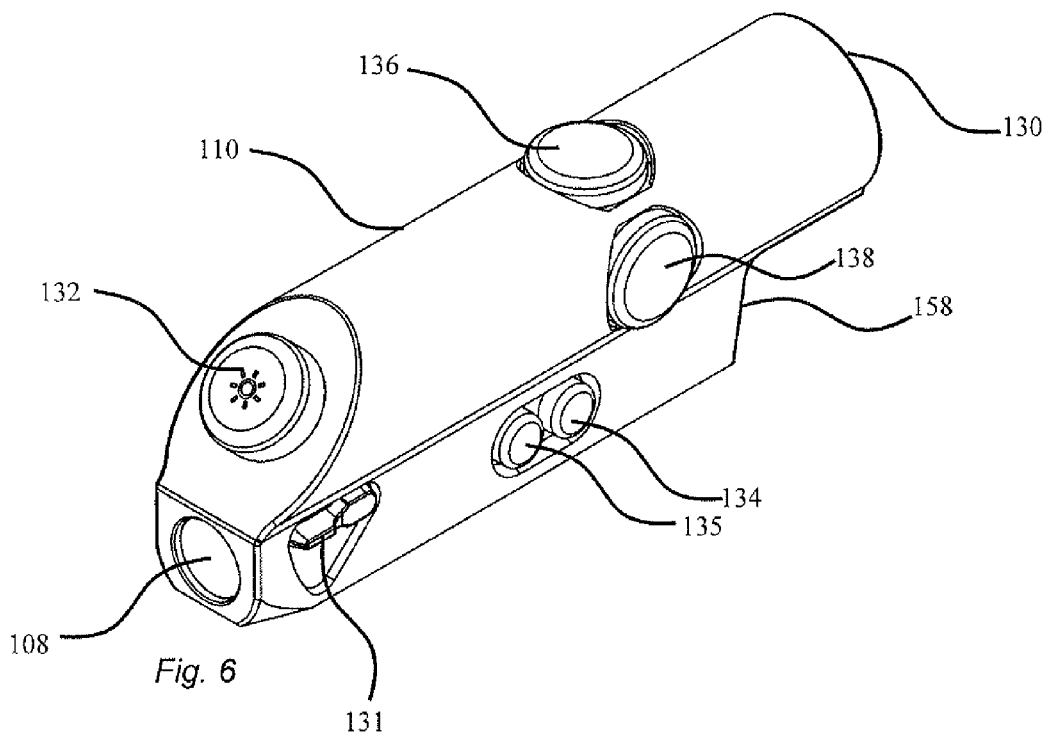
FIG. 6 is a perspective view of a commercial version of the sight of FIGS. 1 and 2.

FIG. 6 illustrates a perspective view of a commercial design of the inventive sight. In this design too, the red dot sight is located below the telescopic sight, both sights being housed within the same housing 110. In FIG. 6 the exit window 108 is shown, through which the user observes the target, and inside of this exit window 108 the switchable component is located, in this case a pivotally mounted mirror (not visible). The entrance window 130 of the telescopic sight 120 and the entrance window 158 of the red dot sight 150 are not visible in FIG. 6, but indicated by said reference numbers. A lever 131 for switching the position of the switchable component is shown, and other control means include an intensity regulator 132 for the red dot, a vertical adjustment control 134 for the red dot sight, and a horizontal adjustment control 135 for the same, and corresponding adjustment controls 136 and 138 respectively for the magnifying sight.

Figure 7:
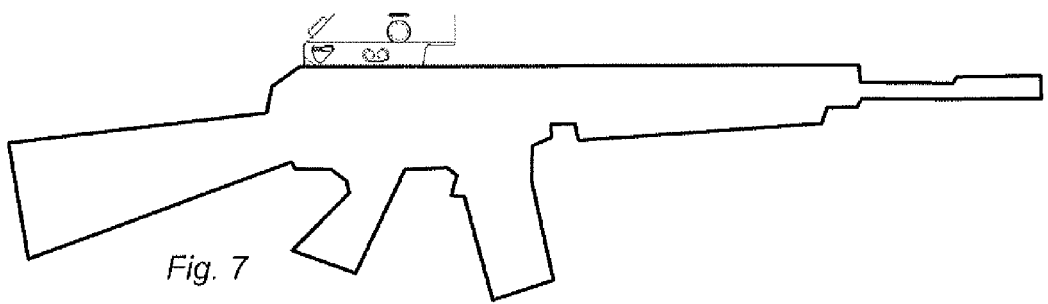
FIG. 7 illustrates a gun provided with a sight according to an embodiment of the invention

FIG. 7 illustrates a gun provided with a sight according to an embodiment of the invention.

It should be noted that the position of the sights as presented in the embodiment is not to be considered limiting for the application. There are advantages with having the non-magnifying sight below the magnifying sight, such as that it will improve visibility when having both eyes opened, however the inventive sight as presently claimed makes no distinction regarding the relative positions of the sights.

The invention claimed is:

1. A combination sight comprising:
   a magnifying optical sight including an entrance window;
   a non-magnifying optical sight including a separate entrance window, the non-magnifying optical sight being arranged in parallel to the magnifying optical sight, wherein a beam path through the magnifying optical sight is parallel to a beam path through the non-magnifying optical sight;
   wherein light passing through the entrance window of the non-magnifying optical sight does not enter into the magnifying optical sight; and
   wherein light passing through the entrance window of the magnifying optical sight does not enter into the non-magnifying optical sight; and
   a switchable component capable of assuming two states so as to deflect a beam path through the combination sight allowing a user to observe a target either through the non-magnifying optical sight or the magnifying optical sight;
   wherein the first state allows for a user to observe a target through the non-magnifying optical sight and the second state allows for a user to observe a target through the magnifying optical sight, while keeping an aiming eye static; and
   wherein, in the first state, the switchable component
      allows observation through the non-magnifying optical sight without deflecting or reflecting the beam path through the non-magnifying optical sight, and
      blocks the beam path through the magnifying optical sight.

2. The combination sight of claim 1, wherein the non-magnifying optical sight is a red dot sight with unlimited eye-relief.

3. The combination sight of claim 1, wherein the switchable component is a single mechanical beam path deflector movable between two positions to deflect the beam path.

4. The combination sight of claim 3, wherein the mechanical beam path deflector is arranged for pivot action around a pivot point to move between the two positions, and
   wherein the pivot action of the mechanical beam path deflector is controlled by turning a lever on the outside of the combination sight.

5. The combination sight of claim 1, wherein the switchable component is an optronic component capable of switching between a light transmitting state and a light reflecting state.

6. The combination sight of claim 5, wherein the optronic component is a liquid crystal display component activated to switch between the two states by application of a voltage potential to the liquid crystal display component.

7. The combination sight of claim 1, wherein two switchable components are implemented, which are capable of switching between a transmittive state and a non-transmittive state,
   wherein the two switchable components include a first switchable component that is arranged in the beam path of the magnifying optical sight, and a second switchable component that is arranged in the beam path of the non-magnifying optical sight, and
   wherein the two beam paths join in a beam splitter, such that an active beam path may be altered by switching the states of the first and the second switchable components.

8. The combination sight of claim 7, wherein a system including the beam splitter reflects and transmits only one polarization of light, and wherein a system including the two switchable components is arranged to selectively permit passage of light of one polarization only, such that the two systems may be used in combination to selectively permit passage of light.

9. The combination sight of claim 7, wherein a system includes the two switchable components, each of which is capable of functioning as a filter permitting passage of light with one particular polarization, which polarization may be rotated 90°, and a polarization filter, such that the switchable component and the polarization filter may be used in combination to permit, or block, passage of light.

10. The combination sight of claim 1, wherein the magnifying and the non-magnifying optical sights are mounted on top of each other, within a common housing.

11. A gun comprising a combination sight according to claim 1.

* * * * *